United States Patent [19]

Lipp

[11] 4,171,599
[45] Oct. 23, 1979

[54] FOLD STRUCTURE FOR CONNECTING METAL SHEET SECTIONS

[76] Inventor: Xaver Lipp, D 7091 Tannhausen, Ostalbkreis, Fed. Rep. of Germany

[21] Appl. No.: 810,393

[22] Filed: Jun. 27, 1977

[51] Int. Cl.² .............................................. E04D 1/00
[52] U.S. Cl. ...................................... 52/528; 52/536; 52/588
[58] Field of Search ................. 52/528, 536, 542, 545, 52/544, 588, 748, 529–530, 531; 138/163, 170; 285/382, 303, 424

[56] References Cited

U.S. PATENT DOCUMENTS

| 970,885 | 9/1910 | Clemmer | 52/542 |
| 2,063,159 | 12/1936 | Groove | 52/528 |
| 2,098,717 | 11/1937 | Calkins | 52/588 |
| 3,276,171 | 10/1966 | Brown | 52/528 |
| 3,902,288 | 9/1975 | Kundson | 52/528 |

FOREIGN PATENT DOCUMENTS

| 592326 | 7/1925 | France | 52/528 |
| 942543 | 2/1949 | France | 52/528 |

Primary Examiner—Price C. Faw, Jr.
Assistant Examiner—Henry Raduazo
Attorney, Agent, or Firm—Roylance, Abrams, Berdo & Farley

[57] ABSTRACT

One sheet section edge is bent to form two edge portions making a U shape with the sheet. The second sheet section has the adjacent edge bent to form two portions which lie adjacent the two edge portions of the first sheet section, a third portion formed by a 180° bend and an additional bend to engage the inside of the U.

7 Claims, 12 Drawing Figures

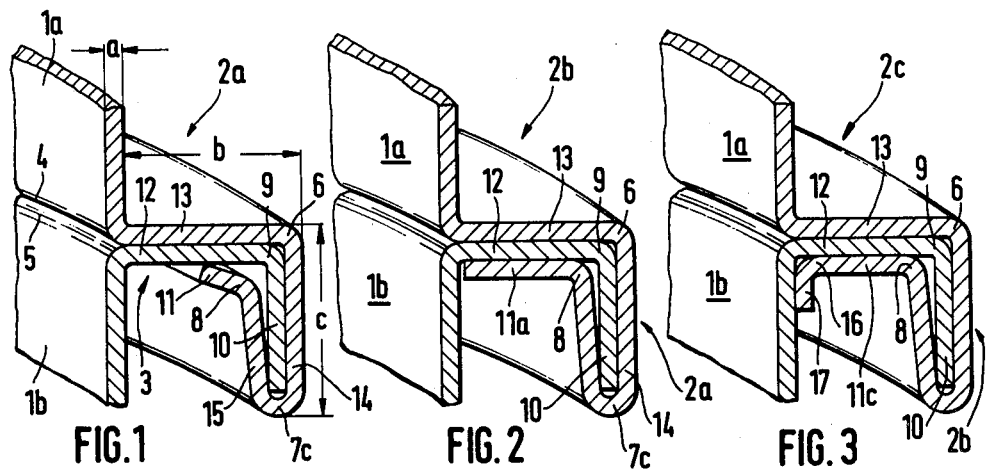
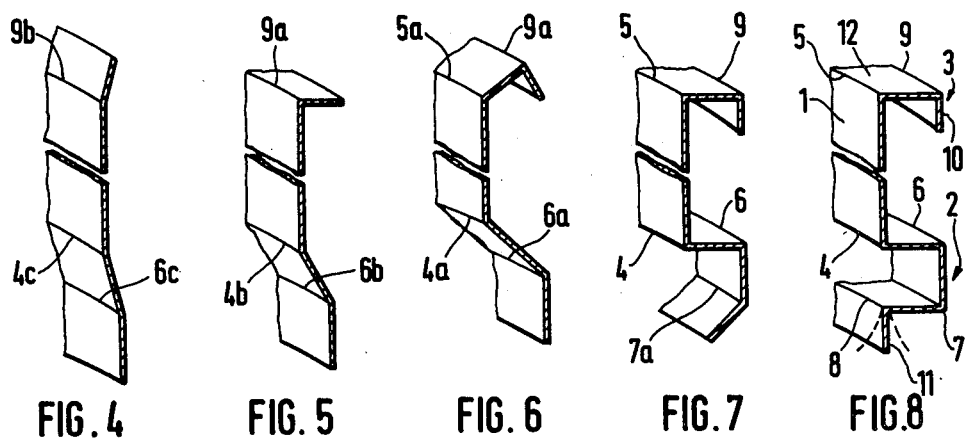
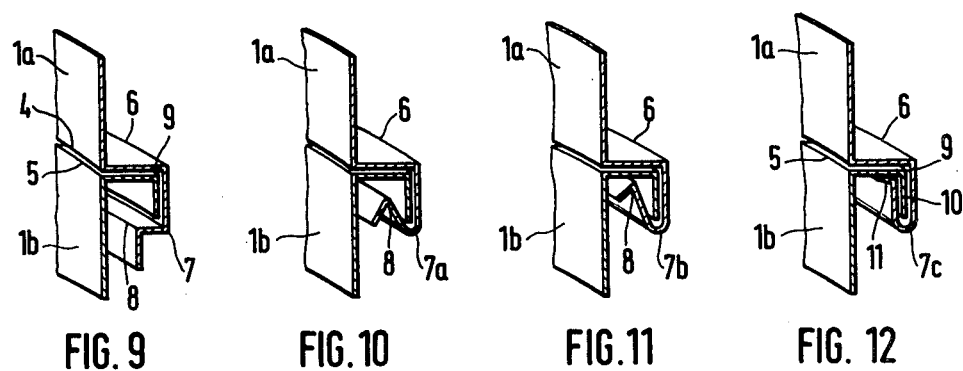

4,171,599

FOLD STRUCTURE FOR CONNECTING METAL SHEET SECTIONS

This invention relates to fold structures for interconnecting the edges of metal sheet sections and particularly to folds for connecting opposite edges of a helically wound strip.

BACKGROUND OF THE INVENTION

The techniques of interconnecting edges of metal sheets, or opposite edges of the same metal sheet, have been the subject of considerable attention, particularly in connection with the construction of large diameter tubular structures wherein an elongated strip of sheet metal is helically wound with its edges interlocked. This technique is used, for example, in making silos. Examples of machines for accomplishing this are found in U.S. Pat. Nos. 3,407,640; 3,838,498; and 3,863,479; in British Pat. No. 899,446; and in German AS 22 10 055.

It has been found that some folded edges of the type shown in the prior art are not stiff enough to connect to edges of, for example, a helically wound strip for a large tubular structure such as a silo, and the danger therefore exists that the folded edge can give way in the axial direction of the tube. In addition, there is a danger that the folded edge can yield and fail when radial forces occur in the fold area. For these reasons, the fold is beaded or rolled so that a standing, double longitudinal fold develops as shown in the above German reference.

Such beading of the fold is possible, however, only when the thickness of the metal sheet is less than about 1/15 of the length of the part extending perpendicular to the metal sheet, or the height of the folded edge. Whenever, the thickness of the sheet is greater, great difficulties are encountered in the continuous formation of the folded edge into a standing, double longitudinal edge. This is particularly true for metal sheets having a thickness greater than 3 mm.

BRIEF DESCRIPTION OF THE INVENTION

An object of the invention is to provide a safe folded connection between two edges of at least one metal sheet, the ratio of the thickness of the sheet to the height of the fold being on the order of 1:6 to 1:14, particularly wherein metal sheets having a thickness of at least 3 mm. are used.

Briefly described, the invention comprises a fold structure for joining together adjacent edge portions of first and second metal sheet sections which lie in substantially parallel, coplanar relationship, the fold structure comprising a first edge portion connected to the first sheet section by a bend of substantially 90° to lie substantially perpendicular to the first sheet section, a second edge portion connected to the first edge portion by a bend of substantially 90° to lie substantially perpendicular to the first edge portion and substantially parallel with the first sheet section, a third edge portion connected to the second sheet section by a bend of substantially 90° to lie substantially perpendicular to the second sheet section and in substantially parallel contiguous relationship with one surface of the first edge portion, a fourth edge portion connected to the third edge portion by a bend of substantially 90° to lie in substantially parallel contiguous relationship with the second edge portion, a fifth edge portion connected to the fourth edge portion by a bend significantly greater than 90° to enclose said second edge portion between said fourth and fifth edge portions, and a sixth edge portion connected to the fifth edge portion by a bend in the range of about 45° to 135°, the sixth edge portion contacting the surface of the first edge portion opposite the third edge portion.

In order that the manner in which the foregoing and other objects are attained in accordance with the invention can be understood in detail, particularly advantageous embodiments thereof will be described with reference to the accompanying drawings, which form a part of this specification, and wherein:

FIG. 1 is a partial perspective view, in partial section, of one embodiment of a fold structure in accordance with the invention;

FIG. 2 is a partial perspective view, in partial section, of a second embodiment of a fold structure in accordance with the invention;

FIG. 3 is a partial perspective view, in section, of a third embodiment of a fold structure in accordance with the invention;

FIGS. 4-8 are foreshortened schematic views, in perspective, of a sheet metal strip showing successive states of profiling of the edges thereof to form fold structures in accordance with the embodiments of FIGS. 1-3; and FIGS. 9-12 are schematic partial perspective views of sheet metal sections showing successive states of the folding of two edges thereof, particularly of a helically wound sheet metal strip, to form a fold in accordance with the invention.

As previously indicated, the fold structure of this invention is particularly useful in joining edges of a flat sheet metal strip to form a large diameter pipe. In accordance with techniques well known in the art, a flat sheet metal strip is bent in a profiling station, not shown, which is disposed on a support framework, the dimensions of which correspond to the diameter of the pipe which is to be produced. The opposite edges of the strip are bent in successive steps in profiling stations as generally illustrated in FIGS. 4-8 in such a way that, as shown in FIG. 8, a cylindrical metal sheet part 1 develops having upper and lower edges bent so that they can interlock with adjacent portions of the same strip. Thus, the lower edge indicated generally at 2 and the upper edge indicated generally at 3 are formed such that edge 2 of the next adjacent upper section can join with the portion 3 of the sheet section shown and portion 2 of the section shown can join with portion 3 of the next adjacent lower section. Near the lower extremity of the sheet a bend 4 of substantially 90° forms a portion which is perpendicular to the major plane of the sheet, and near the upper extremity thereof a bend 5, also of substantially 90°, forms a section 12 which is also perpendicular to the major dimension of the sheet. Lower edge portion 2 has second and third bends 6 and 7 which are in the same direction as each other, but in the opposite direction to bend 4, bends 6 and 7 also being of substantially 90°. An additional bend 8 is also provided, bend 8 being in the same direction as bend 4 and opposite to bends 6 and 7. The upper portion 3 has a second bend 9 in the same direction as bend 5, also of substantially 90°.

In the first step, shown in FIG. 4, toward forming the structure shown in FIG. 8, bends 4c, 6c and 9d are formed, these being partial bends of obtuse angles, viewed in section. In the step shown in FIG. 5, the angles of the bends 4b and 6b are developed more acutely and the angle in the area of bend 9a reaches about 90°. In the following step, FIG. 6, the angles in the area of bends 4a and 6a are developed again more acutely, and additional obtuse angle bend 5a is accomplished. In the next step, the bends 4-6 and 9 are completed and an additional bend 7a is made. The bends 4c, 4b and 4a lead to the bend 4, the bend 5a leads to the bend 5, the bends 6c, 6b and 6a become bend 6, bend 7a becomes bend 7, and bends 9b and 9a lead to bend 9. Bend 8 is completed as shown in FIG. 8 during the last operating step of the profiling of the metal strip.

While those edge portions of the metal strip formed by the bends 4-7 and 9 always lie approximately perpendicularly to each other, the edge portion of the metal strip formed by bend 8, as shown in the dashed lines in FIG. 8, can also assume other angles, for example, in the range between 45° and 135°, approximately.

In FIG. 9, the edges of two sheet sections, such as the adjacent edges of a helically wound metal strip, have been shown, the metal strip having been profiled as shown in FIGS. 4-8, the strip having been wound around with the edges 2 and 3 inside one another. These edges are then fed to a conventional folding station, not shown.

The fold is then produced in a step-by-step fashion in accordance with FIGS. 9-12. After the first folding process in FIG. 10, the bend 7a has been increased to the extent that bend 8 is located in the area of part 12 of the second edge 3 which remains upstanding. In the subsequent steps, bend 7c is further increased so that the first edge 2a finally surrounds on both sides the end of the edge portion 3 and the part 11 of the edge following bend 8 fits, at least on its terminal side, against the part of edge 12 of the second edge 3 lying between bends 5 and 9.

FIG. 1 shows a more complete diagram of the embodiment shown in FIG. 12 wherein the first edge portion of 2a lying between bends 4 and 6 has been identified as edge portion 13, the part of the edge lying between bends 6 and 7c is designated as 14 and the portion of the edge lying between bends 7c and 8 as 15. As can be seen from this, the edge portions 12 and 13, as well as parts 10 and 14 of the edge, fit against each other. The portion 15 of the edge extends on the side of the part 10 of the edge lying opposite part 14 of the edge in a small acute angle as against the part 10 of the edge. The width of portion 15 is substantially equal to the width of part 10 as shown in FIG. 1. The part 11 of the edge separated from the part 15 of the edge by bend 8 fits under tension with its end against edge part 12 with bend 8 having a somewhat larger angle than 90°. The transverse position of edge part 15 in relation to the edge part 10 is to be traced back to the rebounding of the edge part 15 of the first edge 2a. Edge part 11, which can fit slantingly against edge part 12, results in a stiffening of reinforcement which opposes a rebounding upward of the silo in an axial direction.

In FIG. 1, the thickness of the metal sheet is designated by the dimension a, the radial length of the height of the fold by dimension b, and the axial length of the fold structure by c. The height b of the fold amounts to about 6 to 14 times the thickness a of the metal sheet. Lengths b and c can be made approximately equal. In the embodiment shown by way of example, the length c is somewhat shorter than length b. The folding connection is suitable particularly for metal sheets with a thickness of at least 3 mm., and the upper limit of the thickness of the metal sheet is about 6 mm. In the case of a metal sheet having a thickness a equalling 4 mm., the height b can be, for example, 40 mm., and the axial length c can be about 30 mm.

A second embodiment of a fold structure in accordance with the invention is shown in FIG. 2 wherein the part 11a of the first edge 2b is longer than the edge part 11 of the first embodiment shown in FIG. 1. The edge part 11a extends up to the remaining part 1b of the metal sheet 1 parallel with edge part 10. It can be supported by this part of the metal sheet and fits against edge part 12 because of the bending upwards of bend 8.

A further embodiment is shown in FIG. 3 wherein part 11c of the first edge 2c is bent once more at bend 16 at an angle of about 90° such that end 17 of this edge portion extends along cylindrical sheet metal part 1b. With this additional bend, an additional reinforcement or stiffening of the fold and a safe support of the end 17 of the edge on sheet metal part 1b is achieved for an additional tensioning of the fold to oppose radial forces. The bend 16 has the same direction as bend 8.

The profiling and folding processes are accomplished, as previously indicated, in known manners by means of rolls or rollers corresponding to the angles required in the execution of the individual shaping steps.

From this, it will be seen that the embodiments shown in FIGS. 1 and 2 include a fold structure to join a first sheet 1b and a second sheet 1a, the structure including a first edge portion 12, a second portion 10, a third edge portion 13, a fourth edge portion 14, a fifth edge portion 15 and a sixth edge portion 11. In addition, the embodiment of FIG. 3 includes a seventh edge portion 17.

The additional fold results in a safe contact of the first edge of the metal sheet to the second edge to the metal sheet which opposes any opening of the fold in the event of action of force in the direction of the remaining sheet metal parts, especially in the axial direction of the wound pipe. The end of the first edge fits with pre-tension against the second edge and holds firmly to the latter in a claw-like manner, so that a rebounding of the end of the first edge will be prevented. As a result of the third bevel, the fold will be stiffened additionally.

In the case of the development of the fold in accordance with the second embodiment, a rebounding of the free end of the first edge is avoided more the longer that edge is, in which case it can also fit against the sheet metal part having the second edge. Because of the tension in the end of the first edge seeking a rebounding, a tensioning of the fold occurs in the direction of the remaining sheet metal parts.

The characteristics of the embodiment of FIG. 3 make possible a secure support of the end of the first edge on the remaining sheet metal part having the second edge, and a secure tensioning of the fold in a perpendicular direction to the remaining sheet metal part, especially in a radial direction of the pipe or silo wound from a strip of sheet metal.

While certain advantageous embodiments have been chosen to illustrate the invention, it will be understood by those skilled in the art that various changes and modifications can be made therein without departing from the scope of the invention as defined in the appended claims.

What is claimed is:

1. A fold structure for joining together adjacent edge portions of first and second metal sheet sections which lie in substantially parallel, coplanar relationship, said fold structure comprising a first edge portion connected to said first sheet section by a bend of substantially 90° to lie substantially perpendicular to said first sheet section;

a second edge portion connected to said first edge portion by a bend of substantially 90° to lie substantially perpendicular to said first edge portion and substantially parallel with said first sheet section, said second edge portion terminating in a distal edge;

a third edge portion connected to said second sheet section by a bend of substantially 90° to lie substantially perpendicular to said second sheet section and in substantially parallel contiguous relationship with one surface of said first edge portion;

a fourth edge portion connected to said third edge portion by a bend of substantially 90° to lie in substantially parallel contiguous relationship with said second edge portion;

a fifth edge portion connected to said fourth edge portion by a bend significantly greater than 90° to enclose said second edge portion between said fourth and fifth edge portions with said fifth and second edge portions being substantially equal in width and with said fourth and fifth edge portions in contact with said second edge portion; and a sixth edge portion connected to said fifth edge portion by a bend in the range of about 45° to 135°, said sixth edge portion contacting the surface of said first edge portion opposite said third edge portion.

2. A fold structure according to claim 1 wherein the width of said sixth edge portion is substantially equal to the width of said first edge portion so that said sixth and first edge portions are in parallel contiguous relationship over substantially all of their widths.

3. A fold structure according to claim 1, wherein said edge portions are formed from metal sheets having a thickness greater than 3 mm.

4. A fold structure according to claim 1, wherein the ratio of the thickness of said edge portions to the height of the fold structure is approximately 1:6 to 1:14.

5. A fold structure according to claim 1 and further comprising a seventh edge portion connected to said sixth edge portion by a bend of substantially 90° so that said seventh edge portion lies in parallel relationship with said first sheet section.

6. A fold structure for joining together adjacent edge portions of first and second metal sheet sections which lie in substantially parallel, coplanar relationship, said fold structure comprising a first edge portion connected to said first sheet section by a bend of substantially 90° to lie substantially perpendicular to said first sheet section;

a second edge portion connected to said first edge portion by a bend of substantially 90° to lie substantially perpendicular to said first edge portion and substantially parallel with said first sheet section;

a third edge portion connected to said second sheet section by a bend of substantially 90° to lie substantially perpendicular to said second sheet section and in substantially parallel contiguous relationship with one surface of said first edge portion;

a fourth edge portion connected to said third edge portion by a bend of substantially 90° to lie in substantially parallel contiguous relationship with said second edge portion;

a fifth edge portion connected to said fourth edge portion by a bend significantly greater than 90° to enclose said second edge portion between said fourth and fifth edge portions;

a sixth edge portion connected to said fifth edge portion by a bend in the range of about 45° to 135°, said sixth edge portion contacting the surface of said first edge portion opposite said third edge portion, the width of said sixth edge portion being substantially equal to the width of said first edge portion so that said sixth and first edge portions are in parallel contiguous relationship over substantially all of their widths; and a seventh edge portion connected to said sixth edge portion by a bend of substantially 90° so that said seventh edge portion lies in parallel contiguous relationship with said first sheet section.

7. A fold structure according to claim 6 wherein said bend connecting said fifth and fourth edge portions is substantially 180°, the inner diameter of curvature of said bend being approximately equal to the thickness of said second edge portion.

* * * * *